March 1, 1966 J. W. ORENDORFF 3,237,811
SELF-CLEANING FERTILIZER DRIVE WHEEL
Filed Feb. 4, 1964 2 Sheets-Sheet 1
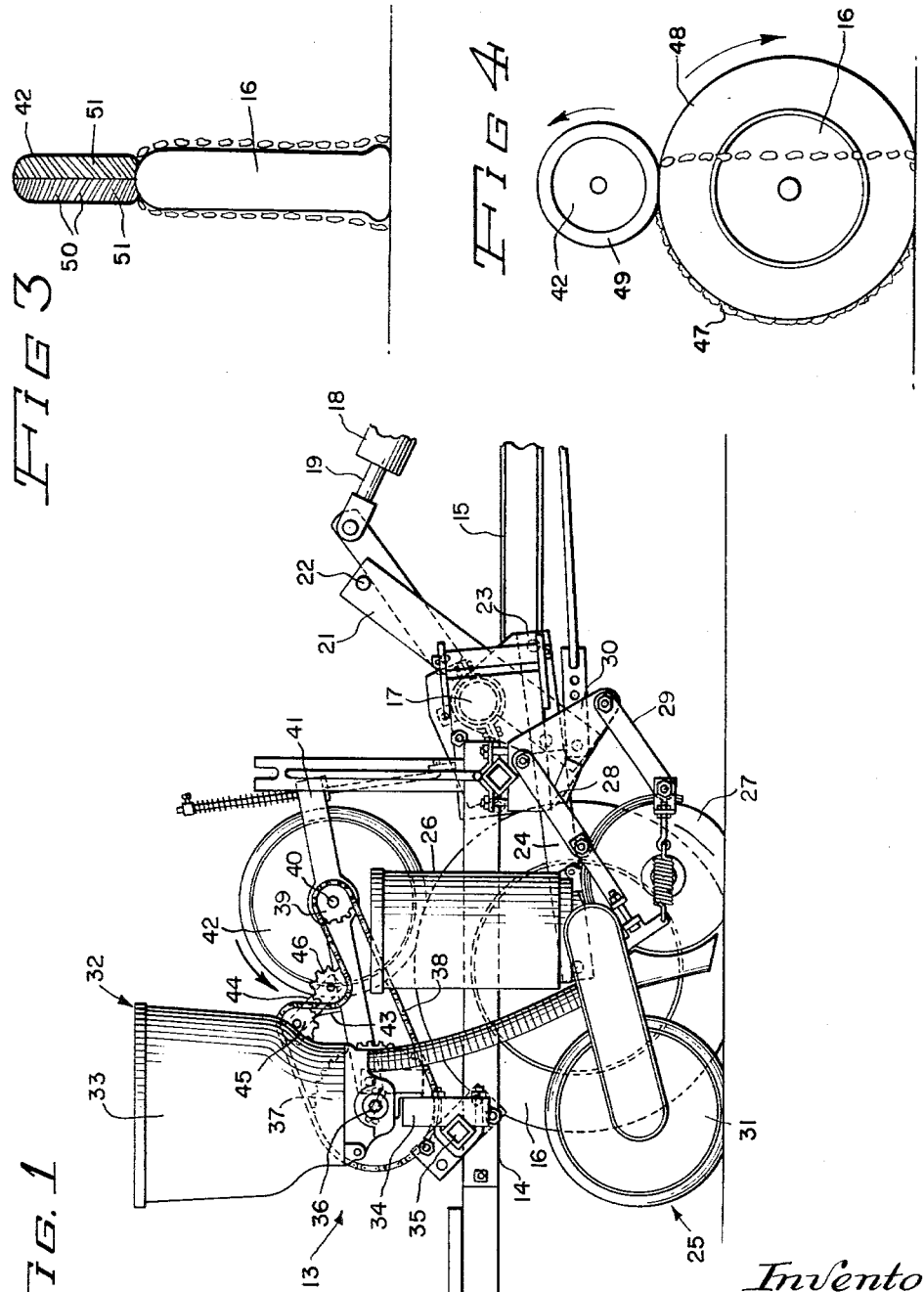
Inventor:
John W. Orendorff
By J K McNeill
Atty.

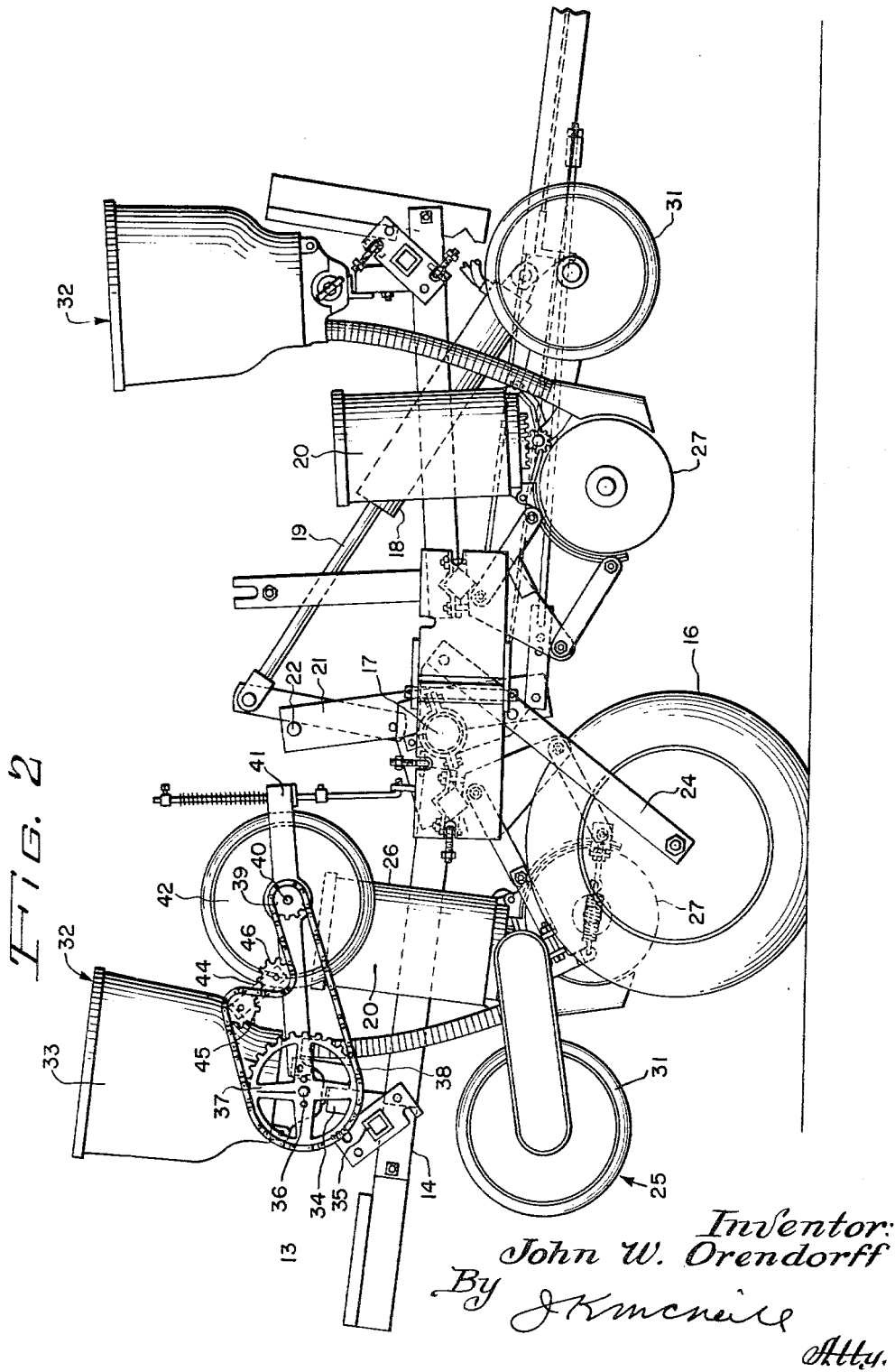

3,237,811
SELF CLEANING FERTILIZER DRIVE WHEEL
John W. Orendorff, Downers Grove, Ill., assignor to International Harvester Company, Chicago, Ill., a corporation of New Jersey
Filed Feb. 4, 1964, Ser. No. 342,484
5 Claims. (Cl. 222—177)

This invention relates to agricultural implements and particularly to material dispensers. More specifically, the invention concerns improved drive means for a material dispenser.

In planters, fertilizer distributors, and the like wherein a supporting frame for the material dispenser is mounted on ground-engaging wheels and propelled by a tractor or the like, it is known to utilize the rotation of the ground wheel and provide a driving connection there-between and the parts or parts to be driven. It is also known to transmit drive from a ground wheel to a driven part through frictional engagement with a drive transmission wheel. Such drive transmissions for material dispensers have generally proved unsatisfactory, particularly in moist ground conditions because the accumulation of wet soil on the ground wheel and the drag of the dispenser mechanism on the contacting wheel caused slippage of the latter relative to the ground wheel. The consequent interruption in the drive to the dispenser resulted in non-uniform distribution of material.

Therefore, an object of this invention is the provision of improved drive transmission means for agricultural dispensers for seed, fertilizer and the like.

Another object of the invention is the provision of a novel drive transmission wheel in combination with a ground drive wheel for transmitting uninterrupted power to an implement part to be driven.

Another object of the invention is the provision of improved means for transmitting drive from a ground wheel to a driven implement part through frictional engagement with another wheel having a tread configuration designed to prevent slippage therebetween and the ground wheel.

Other objects and advantages of the invention will become clear from the following detailed description when read in conjunction with the accompanying drawings wherein:

FIGURE 1 is a view in side elevation of an implement for dispensing seed and fertilizer incorporating the features of this invention, FIGURE 2 is a view similar to FIGURE 1 but showing the implement parts in a raised or non-operating position, FIGURE 3 is a diagrammatic rear elevation showing the drive and ground wheel combination of this invention, and FIGURE 4 is a diagrammatic showing of the structure of FIGURE 3 in side elevation, illustrating the manner in which moist soil is picked up by the ground wheel and discharged by engagement with the frictional contact wheel of this invention.

In the drawings there is shown a planter 13 adapted for connection to a tractor having a supporting frame 14 including a hitch structure 15 for connection at its front end to the tractor, not shown. Many of the details of construction of the implement shown in the drawings form no part of this invention, and for a more complete description thereof reference may be had to U.S. application Serial No. 307,414, filed September 9, 1963. However, it may be understood that the planter shown in the drawings is of the folding wing type, and FIGURE 2 shows one of the outer wings swung forwardly for transport.

The supporting frame 14 is mounted on laterally spaced ground-engaging wheels 16 and carries a transversely extending rockshaft 17 which is rocked by a hydraulic cylinder 18 anchored to the forward end of the hitch 15 and having a piston rod 19 slidable therein. Piston rod 19 is connected to a link 20 pivoted upon a lever 21 and engageable with a pin 22 carried by the upper end of the lever.

Lever 21 is affixed to the rockshaft 17 to which is also affixed a plate 23, one for each wheel 16. Plate 23 has affixed thereto a rearwardly extending arm 24 upon the end of which wheel 16 is carried. By extending the piston rod 19 in the cylinder 18 lever 21 is rocked in a counterclockwise direction to swing wheels 16 downwardly and thus raise the frame to the position of FIGURE 2.

A plurality of seed planting units 25 are mounted at laterally spaced locations on the frame 14 and each includes a seed hopper 26 and a furrow opener 27 supported by parallel links 28 and 29 pivoted upon a plate 30 secured to frame 14. The mechanism by which seed is discharged from the hopper 26 is driven by conventional means from a ground wheel 31.

A fertilizer dispenser is designated by the numeral 32 and includes a fertilizer hopper 33 mounted upon a bracket 34 secured to a transverse bar 35 carried by the frame 14 and incorporating therein conventional fertilizer discharging mechanism, not shown, driven from a shaft 36, upon which is mounted a sprocket wheel 37 connected by an endless chain 38 with a sprocket wheel 39 mounted on a shaft 40 carried at the end of an arm 41 secured to the fertilizer dispenser 32 and extending forwardly thereof. A fertilizer drive wheel 42 is mounted on the shaft 40 and, in the operating position of the implement shown in FIGURE 1, frictionally engages the pheriphery of the ground wheel 16 and is driven thereby in the direction of the arrow shown in FIGURE 1. A lug 43 secured to arm 41 carries a bar 44 upon which is mounted a pair of idler sprockets 45 and 46 engageable with the drive chain 38.

As indicated in FIGURE 4, the implement ground wheel 16 picks up dirt indicated at 47 and carriers it upwardly until it reaches the wheel 42.

Both of the wheels 16 and 42 are of the pneumatic type, tire 48 of wheel 16 being filled with air, and the rubber tire 49 of wheel 42 being preferably of the zero pressure type but having a tread design shown particularly well in FIGURE 3.

The treads on the periphery of the tire 49 are generally V-shaped, as indicated in FIGURE 3, and those V-shaped treads 50 project from the periphery of the tire to provide channels 51 therebetween.

As will be observed from FIGURE 3, the apices of the V or chevron shaped treads 50 extend in the direction of rotation of wheel 42. Dirt 47 adhering to wheel 16 engages the lower peripheral surface of the tire 49 and is expressed laterally outwardly through the channels 51 between treads 50 in the manner indicated in FIGURE 3 and falls to the ground. Thus, build up of moist soil on the periphery of wheel 16 is prevented, and driving engagement is made between the surfaces of the tires 48 and 49 so that no slippage occurs therebetween, and constant drive is transmitted to the sprocket 37 and the fertilizer discharge mechanism driven thereby.

It is believed that the construction and operation of the improved dispenser drive mechanism of this invention will be clearly understood from the foregoing description. It should likewise be understood that the invention has been described in its preferred embodiment, and that modifications may be made therein without departing from the spirit of the invention or the scope of the appended claims.

What is claimed is:

1. An implement having a traveling frame, a ground wheel mounted on and supporting the frame, a driven implement part mounted on the frame, a drive wheel carried by the frame and frictionally engageable with the ground wheel, and means forming a driving connection between said drive wheel and said implement part for driving the latter in response to the rotation of said drive wheel, said drive wheel being driven by its engagement with said ground wheel in the opposite direction therefrom and adapted to slip with respect thereto as a result of the driving load on the drive wheel imposed by said implement part, said drive wheel having a tread pattern comprising circumferentially spaced generally V-shaped elevations projecting from the periphery of the wheel, the slippage between the engaging surfaces of said wheels causing dirt picked up by and adhering to the periphery of said ground wheel to be expressed laterally outwardly between said V-shaped elevations.

2. The invention set forth in claim 1, wherein said drive wheel is smaller in diameter than said ground wheel.

3. The invention set forth in claim 1, wherein said implement is a planter and said driven implement part is mechanism for dispensing material to the ground.

4. The invention set forth in claim 1, wherein the apex of each of said V-shaped elevations extends in the direction of rotation of said drive wheel.

5. The invention set forth in claim 4, wherein each of said projections is in the shape of a broken V wherein one leg of said V is separated from the other leg thereof.

References Cited by the Examiner

UNITED STATES PATENTS

| | | | |
|---|---|---|---|
| 2,241,227 | 5/1941 | Wait et al. | 152—209 |
| 2,474,013 | 6/1949 | Rawls | 152—209 |
| 2,742,196 | 4/1956 | Grether | 222—177 X |
| 2,833,542 | 5/1958 | Martin | 222—177 X |
| 2,893,740 | 7/1959 | Guddis | 222—177 X |
| 2,954,836 | 10/1960 | Cavanaugh | 74—230.6 X |

LOUIS J. DEMBO, *Primary Examiner.*

CHARLES R. CARTER, *Examiner.*